United States Patent [19]
Gandini et al.

[11] 4,345,325
[45] Aug. 17, 1982

[54] MESSAGE-INTERCHANGE CIRCUITRY FOR MICROPROCESSORS LINKED BY SYNCHRONOUS COMMUNICATION NETWORK

[75] Inventors: Marco Gandini; Ernesto Viale, both of Turin, Italy

[73] Assignee: CSELT-Centro Studi e Laboratori Telecomunicazioni S.p.A., Turin, Italy

[21] Appl. No.: 141,484

[22] Filed: Apr. 18, 1980

[30] Foreign Application Priority Data

Apr. 19, 1979 [IT] Italy .............................. 67819 A/79

[51] Int. Cl.³ .......................... H04J 3/02; H04L 5/22
[52] U.S. Cl. .................................... 370/29; 364/900; 370/61; 370/91; 370/108; 375/25; 375/106
[58] Field of Search ................... 375/7, 25, 106, 118; 370/29, 61, 85, 91, 108, 109; 364/200 MS File, 900 MS File

[56] References Cited
U.S. PATENT DOCUMENTS 3,848,233 11/1974 Lotian et al. ....................... 364/200

*Primary Examiner*—Marc E. Bookbinder
*Attorney, Agent, or Firm*—Karl F. Ross

[57] ABSTRACT

A microprocessor associated with a PCM telecommunication network dialogues with remote data-handling components such as other microprocessors through message-interchange circuitry which includes a read/write memory having storage areas individually allocated to several PCM channels, one storage area serving to receive incoming messages destined for the local microprocessor while the remaining storage areas serve for the transmission of outgoing messages intended for respective remote components. A control unit, timed by signals from a synchronization extractor coupled to the network, communicates with the memory to detect state words written by the microprocessor into the memory to indicate the loaded or vacant condition of its storage areas. When the words of an outgoing message are asynchronously written by the local microprocessor into respective cells of a selected transmitting area, a corresponding state word causes the control unit to read out the message words synchronously to the network in the assigned time slot of consecutive PCM frames. Conversely, the words of an incoming message synchronously written into respective cells of the receiving area by the control unit, responding to the arrival of a distinctive start code, are asynchronously read out to the local microprocessor in response to a request signal from the latter.

6 Claims, 2 Drawing Figures

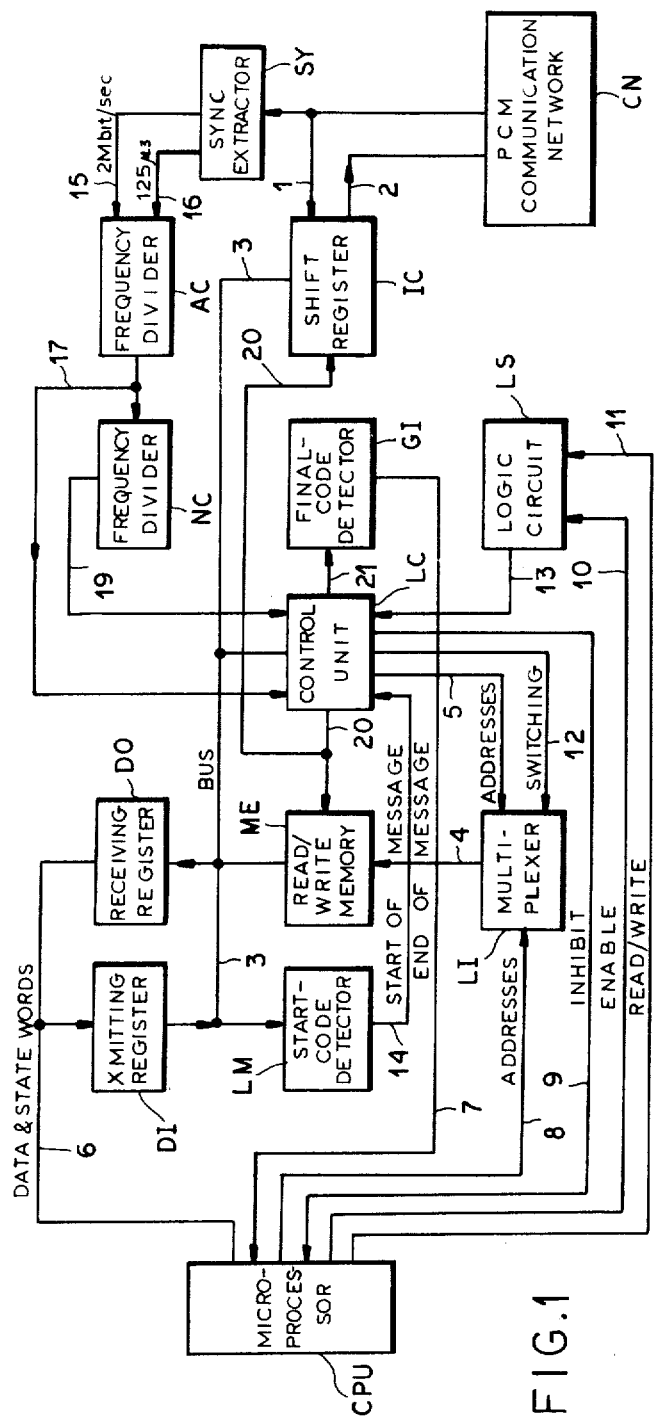
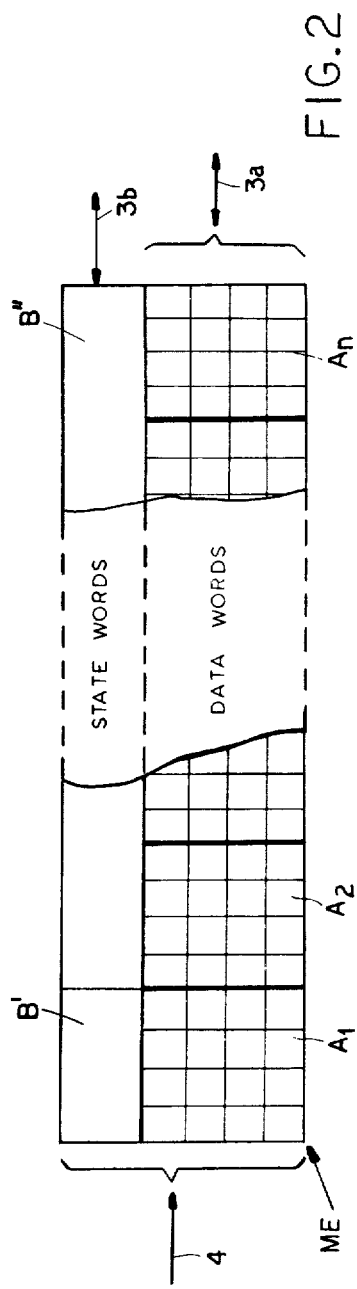
FIG.1
FIG.2

4,345,325

MESSAGE-INTERCHANGE CIRCUITRY FOR MICROPROCESSORS LINKED BY SYNCHRONOUS COMMUNICATION NETWORK

FIELD OF THE INVENTION

Our present invention relates to a data-transmitting system including circuitry for the interchange of digital messags among two or more microprocessors which are linked with one another by synchronously operating communication means such as a telecommunication network of the pulse-code-modulated (PCM) type.

BACKGROUND OF THE INVENTION

When microprocessors associated with such a network are to dialogue with one another through the intermediary of that network, their messages must be synchronously introduced into and extracted from the data flow of the network even though the microprocessors themselves are generally timed by their own independent clocks. It has heretofore been customary to interlink the several microprocessors by point-to-point connections enabling the direct transfer of data therebetween, yet this solution entails great circuit complexities especially when a significant number of microprocessors or other data-handling components are involved. With more than two microprocessors there is also the problem of avoiding interferences among messages concurrently arriving at the same destination. Moreover, each connection must have its own interface circuitry and data stores along with control means therefor. The handling of the messages is relatively slow and thus significantly impedes the work of a processing unit operating in real time. The use of multiprocessing techniques with a common bus interconnecting a multiplicity of memories is only a partial remedy and tends to reduce the flexibility of the system.

OBJECT OF THE INVENTION

The object of our present invention, therefore, is to provide improved message-interchange circuitry for the purpose set forth, designed to facilitate the use of an available PCM network or other synchronously operating communication means as the vehicle for a dialogue among microprocessors having access thereto.

SUMMARY OF THE INVENTION

In accordance with our present invention we provide, in association with a local microprocessor, a read/write memory having a receiving area with cells for the temporary storage of incoming message words and one or more transmitting areas with cells for the temporary storage of outgoing message words, each transmitting area being assigned to a respective remote data-handling component such as another microprocessor. The local microprocessor also supplies the memory with information, referred to hereinafter as a state word, representing the activity of each transmitting area, especially its loaded or vacant condition. The several storage areas are linked with the synchronous communication means, referred to hereinafter as a PCM network, by input/output means such as a multiconductor bus. The cells of a transmitting area are asynchronously loadable with outgoing message words by the local microprocessor via first circuit means with concurrent updating of the corresponding activity information (i.e. state word) whereas incoming message words stored in cells of the receiving area can be asynchronously read out to that microprocessor by second circuit means. A control unit, synchronized with the PCM network, responds to a state word, indicating the presence of an outgoing message in a transmitting area, for synchronously reading out the contents of its cells to that network. The control unit also responds to the arrival of a start code from the network for supplying the memory with activity information relating to the receiving area and for writing incoming message words into cells of this area in the presence of a state word indicating its vacant state; it further modifies the relevant state word upon completion of a message transfer between a storage area and the network.

With a PCM network handling binary data words in a multiplicity of time slots forming part of a recurrent frame, the several storage areas of the memory have respective time slots allocated to them in which message words are sent out to the network or extracted therefrom in consecutive frame cycles. The control unit can be induced by a first detector, responsive to a distinctive start code forming part of the first word of an incoming message, to make the cells of the receiving area successively accessible to the words of this message; a second detector responds to a final code from the control unit for reporting to the microprocessor the completion of a transfer operation. We also prefer to provide switchover means, such as a multiplexer, settable by the control unit in response to the start code and to reading and writing commands from the local microprocessor for enabling selective addressing of the storage areas alternately by that microprocessor and by the control unit, with priority given to the latter.

BRIEF DESCRIPTION OF THE DRAWING

The above and other features of our present invention will now be described in detail with reference to the accompanying drawing in which:

FIG. 1 is a block dagram of message-interchange circuitry in a PCM system embodying our invention; and FIG. 2 shows the layout of a read/write memory included in the circuitry of FIG. 1

SPECIFIC DESCRIPTION

In FIG. 1 we have shown at CPU a microprocessor, conventionally available as an integrated-circuit chip, associated with a PCM communication network CN which is also connected to other such microprocessors and is synchronously operated by a nonillustrated clock. In accordance with the usual practice, the network may carry 8-bit data words or bytes at a rate of two Mbits per second, one bit of each byte occurring in a time slot assigned to a respective communication channel; a byte is therefore generated in an eight-frame cycle lasting for 125 μsec. A synchronization extractor SY emits on a lead 15 the bit rate and on a lead 16 the count of a frame cycle, these timing and synchronizing signals being fed to a pair of cascaded frequency dividers AC and NC with respective output leads 17 and 19 terminating at a control unit LC. From the pulses appearing on leads 17 and 19, unit LC ascertains the beginning of each frame cycle and the occurrence of each time slot.

Network CN communicates via an incoming lead 1 and an outgoing lead 2 with a shift register IC connected to a two-way multiconductor bus 3. Register IC, stepped by an output connection 20 from control unit LC, is serially loaded from lead 1 and unloaded in parallel via bus 3 to convert successive bits of an 8-bit incoming message word into a group of as many bits concurrently passing over respective conductors of bus 3. Conversely, eight bits of an outgoing message word are loaded in parallel from bus 3 into respective stages of register IC for serial readout via lead 2.

Another two-way bus 6 connected to microprocessor CPU is linked with bus 3 through a transmitting register DI and a receiving register DO also capable of storing eight message bits at a time, with parallel loading and unloading. A read/write memory ME, more fully illustrated in FIG. 2, has data inputs and outputs connected to bus 3 and is addressable by a conductor multiple 4 originating at a multiplexer LI. Via a switching input 12, control unit LC sets the multiplexer LI to connect address multiple 4 either to a similar multiple 5 originating at that control unit or to another such multiple 8 extending from microprcessor CPU. A decoder, LM, connected to input leads of bus 3 in parallel with register DO, detects a distinctive start code in the first word of an incoming message received from a PCM channel assumed to be allocated to unit CPU; the appearance of such a start code is reported by detector LM to control unit LC via a lead 14. Another detector GI responds to a final code, received via a connection 21 from control unit LC, to inform microprocessor CPU by way of a lead 7 that the readout of an outgoing message from memory ME over bus 3 and shift register IC to network conductor 2 or the entry of an incoming message from network conductor 1 into the memory over the same path has been terminated. A logic circuit LS receives enabling signals and read/write commands from microprocessor CPU via respective leads 10 and 11, the reception of such a command being reported to control unit LC via a lead 13. Output connection 20 of unit LC also conveys reading or writing instructions to memory ME. A further lead 9 extending from control unit LC to microprocessor CPU carries an inhibition signal which sets the microprocessor in a waiting state pending the execution of a writing command emitted on lead 11.

As shown in FIG. 2, memory ME is divided into several storage areas for data and message words, namely a receiving area $A_1$ and a number of transmitting areas $A_2$-$A_n$, all assigned to respective PCM channels. Each area $A_1$ to $A_n$ is subdivided into a plurality of cells corresponding to the number of message words to be stored therein. The memory also has sections B' and B" containing state words respectively relating to the activities of receiving area $A_1$ and transmitting areas $A_2$-$A_n$. The state word in section B" identifies, e.g. by its four least-significant bits, a particular transmitting area and also indicates by a further bit whether the loading of that area has or has not been completed. Two-way connections $3a$ and $3b$ extending to bus 3 (FIG. 1) enable words to be written in or read out from any area $A_1$-$A_n$ or section B', B", respectively, as selected by address information present on multiple 4.

Transmitting register DI of FIG. 1 feeds both data and state words from bus 6 via bus 3 to writing leads of multiples $3a$ and $3b$. Control unit LC communicates directly only with memory sections B' and B", via multiple $3b$, while shift register IC has access to the message areas by way of multiple $3a$.

Operation

When microprocessor CPU has a message for a remote processor linked with network CN, it energizes lead 10 as an enabling signal and emits a writing command via lead 11 to logic circuit LS which transmits this command to control unit LC. If the latter is not currently engaged in addressing the memory ME for writing an incoming message from bus 3 into receiving area $A_1$ or discharging an outgoing message from a transmitting area $A_2$-$A_n$ to that bus, it will switch the multiplexer LI by way of lead 12 to interconnect address multiples 4 and 8, thereby rendering the memory ME receptive to a message word and a state word then present in register DI. The location of a selected transmission area is given by the address code on processor output 8 and also determines the makeup of the state word. As soon as the loading of the first cell of this transmitting area has been accomplished, unit LC discontinues an inhibit signal which it had generated on lead 9 immediately upon reception of the writing command. The microprocessor then loads other cells of the area in like manner and, after emission of the last word, may carry out other operations while the system of FIG. 1 transmits the outgoing message to network lead 2 by way of shift register IC.

Such transmission is initiated by unit LC upon discovery of a state word in memory section B" whose discriminating bit indicates a complete loading of a transmitting area by the microprocessor and which also identifies that area. After switching the multiplexer LI to interconnect the two multiples 4 and 5, unit LC addresses the first cell of the area so identified to read out the stored message word in the corresponding time slot of an 8-frame cycle and simultaneously increments the address on its output 5 to designate the next-following cell of the selected area. In the succeeding frame cycle the second cell is read, and so forth until the complete message has been emitted. Upon the reading of the last cell, unit LC energizes the connection 21 whereby code detector GI is triggered into sending an acknowledgment signal to microprocessor CPU via lead 7. Such an acknowledgment signal is needed by the microprocessor in order to determine whether a transmitting area previously used has been cleared and memory ME is thus available for the writing of another outgoing message.

The first word of any message generated by the microprocessor, accompanied by an address on output 8 identifying the transmitting area assigned to the remote processor for which the message is intended, carries a distinct start code; that word may also be used to identify the local unit CPU. Upon reception of the first word of an incoming message destined for this microprocessor, appearing in the time slot scanned by register IC when no message words are being sent out, logic circuit IM detects the starting code and alerts control unit LC via lead 14 to the arrival of the message. Unit LC then again switches the multiplexer LI into a position in which it can address the first cell of the receiving area $A_1$ while emitting a writing signal on connection 20. The state word read out at the same time from memory section B' should indicate that the receiving area is vacant; if it were not, the originating remote microprocessor (whose identity may be indicated in the message) would repeat the emission upon failure to receive a reply from unit CPU. If area $A_1$ has been cleared, unit LC writes the incoming message word into the first cell thereof and then increments the address in its output 5 to identify the second cell of that area. In the next-following frame cycle, the second word of the incoming message is written in the cell last identified, and so on until the entire message has been received and entered. Logic circuit GI, responding to a final code on connection 21, thereupon informs the microprocessor CPU that an incoming message has been stored in memory ME, even as unit LC modifies the state word in section B' to indicate the completed loading of area $A_1$. By emitting an enabling signal together with a reading command on leads 10 and 11, the unit CPU will then instruct unit LC to make the receiving area $A_1$ accessible to the microprocessor for readout in the rhythm of its own clock.

The number of words in each incoming or outgoing message, and thus the number of frame cycles required for its reception or transmission, is limited only by the storage capacity of the various memory areas, i.e. by the number of cells available to each channel.

From the foregoing description it will be apparent that control unit LC directly addresses memory sections B' and B'' but uses indirect addressing for message areas $A_1$-$A_n$ by reading out their identities from the contents of section B''.

We claim:

1. In a digital data-transmitting system, in combination:

a microprocessor:

synchronously operating communication means linking said microprocessor to at least one remote data-handling component;

read/write memory means having a transmitting area and a receiving area with cells for the temporary storage of outgoing message words destined for the remote data-handling component and of incoming message words destined for said microprocessor, respectively, along with information representing the state of activity of each storage area;

first circuit means coupling said microprocessor to said memory means for asynchronously loading the cells of said transmitting area with outgoing message words and for supplying said memory means with activity information relating to said transmitting area;

second circuit means coupling said memory means to said microprocessor for asynchronously supplying same with incoming message words stored in the cells of said receiving area;

input/output means connecting said transmitting and receiving areas to said communication means; and a control unit synchronized with said communication means and responsive to activity information indicative of the presence of an outgoing message in said transmitting area for synchronously reading out the contents of the cells thereof to said communication means and further responsive to the arrival of a start code from said communication means for writing incoming message words into the cells of said receiving area along with activity information relating thereto, said control unit modifying the relevant activity information in said memory means upon completion of a message transfer between a storage area and said communication means.

2. The combination defined in claim 1 wherein said transmitting area is one of several such areas in said memory means, selectively addressable by said microprocessor and by said control unit, each transmitting area being assigned to a respective remote data-handling component dialoguing with said microprocessor.

3. The combination defined in claim 2 wherein said communication means is a PCM network handling binary data words in a multiplicity of time slots forming part of a recurrent frame, each storage area of said memory means being accessible to said network in a respective time slot allocated thereto.

4. The combination defined in claim 3 wherein said input/output means comprises a multiconductor bus and a shift register between said bus and said network for converting serialized incoming bits, appearing in successive frames in the time slot allocated to said receiving area, into parallel bits entering said bus from said network and for converting parallel outgoing bits, entering said bus from a cell of a given transmitting area, into serialized bits inserted in successive frames into the time slot allocated to said given transmitting area.

5. The combination defined in claim 4 wherein said first and second circuit means respectively include a transmitting register and a receiving register interposed between said microprocessor and said bus.

6. The combination defined in claim 2, 3, 4 or 5, further comprising first detector means responsive to the arrival of a start code from said communication means for inducing said control unit to make the cells of said receiving area successively accessible to incoming message words, second detector means responsive to an end code from said control unit for reporting the completion of a message transfer to said microprocessor, and switchover means settable by said control unit in response to said start code and to reading and writing commands from said microprocessor for enabling selective addressing of said storage areas alternately by said microprocessor and by said control unit, with priortiy given to said control unit.

* * * * *